United States Patent
Kimura et al.

(10) Patent No.: US 10,583,808 B2
(45) Date of Patent: Mar. 10, 2020

(54) WIPER DEVICE

(71) Applicant: MITSUBA Corporation, Gunma (JP)

(72) Inventors: Masaaki Kimura, Gunma (JP); Hayato Saito, Gunma (JP)

(73) Assignee: MITSUBA Corporation, Gunma (JP)

( * ) Notice: Subject to any disclaimer, the term of this patent is extended or adjusted under 35 U.S.C. 154(b) by 90 days.

(21) Appl. No.: 15/580,688

(22) PCT Filed: May 31, 2016

(86) PCT No.: PCT/JP2016/065990
§ 371 (c)(1),
(2) Date: Dec. 8, 2017

(87) PCT Pub. No.: WO2016/199619
PCT Pub. Date: Dec. 15, 2016

(65) Prior Publication Data
US 2018/0186338 A1 Jul. 5, 2018

(30) Foreign Application Priority Data

Jun. 9, 2015 (JP) .................................. 2015-116372

(51) Int. Cl.
*B60S 1/08* (2006.01)
*B60S 1/18* (2006.01)
(Continued)

(52) U.S. Cl.
CPC ........... *B60S 1/0807* (2013.01); *B60S 1/0438* (2013.01); *B60S 1/0814* (2013.01); *B60S 1/0862* (2013.01);
(Continued)

(58) Field of Classification Search
CPC .... B60S 1/0807; B60S 1/0438; B60S 1/0814; B60S 1/0862; B60S 1/185; B60S 1/26; B60S 1/28; B60S 1/163; B60S 1/166
(Continued)

(56) References Cited

U.S. PATENT DOCUMENTS

| 4,672,708 | A | | 6/1987 | Williams |
| 4,723,101 | A | * | 2/1988 | Bauer ................... B60S 1/0814 15/250.13 |

(Continued)

FOREIGN PATENT DOCUMENTS

| CN | 104908713 | 9/2015 |
| DE | 3313057 | 10/1984 |

(Continued)

OTHER PUBLICATIONS

"International Search Report (Form PCT/ISA/210) of PCT/JP2016/065990", dated Jul. 12, 2016, with English translation thereof, pp. 1-4.

(Continued)

*Primary Examiner* — Orlando E Aviles
*Assistant Examiner* — Thomas Raymond Rodgers
(74) *Attorney, Agent, or Firm* — JCIPRNET

(57) ABSTRACT

A wiper device is provided. An operating range of each of two sets of wiper arm units can be properly restricted. A first wiper arm unit is prevented from colliding with a first front pillar or a dash panel when a first output shaft of a first speed reduction mechanism has rotated beyond a first control angle, and a second wiper arm unit is prevented from colliding with a second front pillar or the dash panel when a second output shaft of a second speed reduction mechanism has rotated beyond a second control angle.

9 Claims, 4 Drawing Sheets

(51) Int. Cl.
*B60S 1/04* (2006.01)
*B60S 1/26* (2006.01)
*B60S 1/28* (2006.01)

(52) U.S. Cl.
CPC ............... *B60S 1/185* (2013.01); *B60S 1/26* (2013.01); *B60S 1/28* (2013.01)

(58) Field of Classification Search
USPC .............. 15/250.14, 250.3, 250.12, 250.16
See application file for complete search history.

(56) References Cited

U.S. PATENT DOCUMENTS

| | | | | |
|---|---|---|---|---|
| 6,281,649 | B1* | 8/2001 | Ouellette | B60S 1/0416 15/250.12 |
| 7,256,565 | B2* | 8/2007 | Merkel | B60S 1/0814 15/250.12 |
| 8,453,290 | B2* | 6/2013 | Amagasa | B60S 1/481 15/250.17 |
| 2006/0117514 | A1* | 6/2006 | Yagi | B60S 1/166 15/250.3 |

FOREIGN PATENT DOCUMENTS

| | | |
|---|---|---|
| DE | 19744906 | 4/1998 |
| DE | 10011842 | 10/2001 |
| DE | 10125988 | 12/2002 |
| EP | 1242269 | 4/2005 |
| JP | S43-000889 | 1/1968 |
| JP | 55-011361 | 3/1980 |
| JP | 58-076450 | 5/1983 |
| JP | 61-026668 | 2/1986 |
| JP | H06144161 | 5/1994 |
| JP | H07315177 | 12/1995 |
| JP | 3061681 | 6/1999 |
| JP | 2004509003 | 3/2004 |
| JP | 2005155903 | 6/2005 |
| JP | 2006508856 | 3/2006 |
| JP | 2007185975 | 7/2007 |
| JP | 2008018900 | 1/2008 |
| JP | 2009029192 | 2/2009 |
| JP | 2011506169 | 3/2011 |
| KR | 20120097578 | 9/2012 |
| WO | 2015099003 | 7/2015 |
| WO | 2016072233 | 5/2016 |

OTHER PUBLICATIONS

"Office Action of China Counterpart Application," with English translation thereof, dated Oct. 14, 2019, p. 1-p. 18.

* cited by examiner

WIPER DEVICE

CROSS-REFERENCE TO RELATED APPLICATION

This application is a 371 of international application of PCT application serial no. PCT/JP2016/065990, filed on May 31, 2016, which claims the priority benefit of Japan application no. 2015-116372, filed on Jun. 9, 2015. The entirety of each of the above-mentioned patent applications is hereby incorporated by reference herein and made a part of this specification.

BACKGROUND OF THE INVENTION

Field of the Invention

The present invention relates to a butterfly type wiper device having two sets of wiper arms and motor apparatuses.

Description of Related Art

A wiper device configured to wipe accretions such as rainwater or the like adhered to a windshield installed on a vehicle body and secure a visual field of a driver is mounted on a vehicle such as an automobile or the like. The wiper device includes a wiper member configured to wipe the windshield and a motor apparatus configured to drive the wiper member. The wiper member corresponds to a wiper arm unit. The motor apparatus has an output shaft configured to support the wiper member, and the motor apparatus repeats rightward rotation and leftward rotation of the output shaft. Accordingly, the wiper member swings and the wiper member wipes a region that is previously determined on the windshield.

When the output shaft of the motor apparatus is excessively rotated, the wiper member may escape from the predetermined region on the windshield, and for example, move to the outer side of the windshield. An apparatus configured to restrict excessive movement of the wiper member is disclosed in Patent Literature 1. The wiper device disclosed in Patent Literature 1 includes a stopper configured to restrict excessive movement of the wiper member. In addition to the wiper device disclosed in Patent Literature 1, wiper devices disclosed in Patent Literature 2 to Patent Literature 15 are provided.

PRIOR ART LITERATURE

Patent Literature

[Patent Literature 1]
  Japanese Patent Publication No. 2011-506169
[Patent Literature 2]
  European Patent Publication No. 1242269
[Patent Literature 3]
  Japanese Utility Model Registration No. 3061681
[Patent Literature 4]
  Japanese Patent Publication No. 2004-509003
[Patent Literature 5]
  Japanese Patent Publication No. H06-144161
[Patent Literature 6]
  Japanese Patent Publication No. H07-315177
[Patent Literature 7]
  Japanese Utility Model Publication No. S58-076450
[Patent Literature 8]
  Japanese Utility Model Publication No. S61-026668
[Patent Literature 9]
  Japanese Patent Publication No. 2006-508856
[Patent Literature 10]
  German Patent Publication No. 19744906
[Patent Literature 11]
  German Patent Publication No. 10125988
[Patent Literature 12]
  German Patent Publication No. 10011842
[Patent Literature 13]
  German Patent Publication No. 3313057
[Patent Literature 14]
  U.S. Pat. No. 4,672,708
[Patent Literature 15]
  Japanese Utility Model Patent No. S55-011361
[Patent Literature 16]
  Japanese Utility Model Patent No. S43-000889

SUMMARY OF THE INVENTION

Technical Problem

An object of one of embodiments of the present invention is to provide a wiper device, which is a butterfly type wiper device having two sets of wiper units, i.e., a two sets wiper arms and motor apparatuses, providing a wiper device capable of appropriately restricting an operating range of a wiper arm unit of each of the wiper units. Further, the butterfly type includes an opposite type and a facing wiping type.

Solution to Problem

One of embodiments of the present invention is a butterfly type wiper device configured to wipe a windshield of a vehicle and having two sets of wiper arms and two sets of motor apparatuses, wherein the vehicle has a pair of first and second front pillars, and a dash panel coupled to the first and second front pillars, the windshield has a pair of side edge portions supported by the first and second front pillars and a front edge portion supported by the dash panel, the wiper device comprises: a first wiper unit including a first wiper arm unit and a first motor apparatus and disposed at a first end portion of the dash panel; and a second wiper unit including a second wiper arm unit and a second motor apparatus and disposed at a second end portion of the dash panel, the first and second wiper units are disposed to face each other, the first motor apparatus has a first speed reduction mechanism and a first electric motor fixed to the first speed reduction mechanism, the second motor apparatus has a second speed reduction mechanism and a second electric motor fixed to the second speed reduction mechanism, the first speed reduction mechanism has a first output shaft reciprocally rotatably driven by the first electric motor and coupled to the first wiper arm unit of the first wiper unit, the second speed reduction mechanism has a second output shaft reciprocally rotatably driven by the second electric motor and coupled to the second wiper arm unit of the second wiper unit, the first motor apparatus has: a first position sensor configured to detect a position of the first output shaft of the first speed reduction mechanism; and a first controller configured to generate a first position information signal of the first output shaft on the basis of the first position sensor and control a position of the first output shaft within a first control angle that is previously determined, the second motor apparatus has: a second position sensor configured to detect a position of the second output shaft of the second speed reduction mechanism; and a second controller configured to generate a second position information signal of the second output shaft on the basis of the second position sensor and control a position of the second output shaft within a second control angle that is smaller than the first control angle, the first controller and the second controller are electrically connected to each other, the first controller supplies the first position information signal to the second controller, the second controller supplies the second position information signal to the first controller, the first output shaft has a first stopper plate, the second output shaft has a second stopper plate, a width of the first stopper plate is smaller than a width of the second stopper plate, the first speed reduction mechanism has a first stopper protrusion that is able to collide with the first stopper plate, the second speed reduction mechanism has a second stopper protrusion that is able to collide with the second stopper plate, the first stopper protrusion and the first stopper plate prevent the first wiper arm unit from colliding with the first front pillar or the dash panel when the first output shaft is rotated beyond the first control angle, and the second stopper protrusion and the second stopper plate prevent the second wiper arm unit from colliding with the second front pillar or the dash panel when the second output shaft is rotated beyond the second control angle.

One of embodiments of the present invention is a wiper device configured to wipe a windshield of a vehicle having two sets wiper arm units and two sets of motor apparatuses, wherein the vehicle has a pair of first and second front pillars, and a dash panel coupled to the first and second front pillars, the windshield has a pair of side edge portions supported by the first and second front pillar and a front edge portion supported by the dash panel, the wiper device comprises: a first wiper unit including a first wiper arm unit and a first motor apparatus and disposed at a first end portion of the dash panel; and a second wiper unit including a second wiper arm unit and a second motor apparatus and disposed at a second end portion of the dash panel, the first and second wiper units are disposed to face each other, the first motor apparatus has a first speed reduction mechanism and a first electric motor fixed to the first speed reduction mechanism, the second motor apparatus has a second speed reduction mechanism and a second electric motor fixed to the second speed reduction mechanism, the first speed reduction mechanism has a first output shaft reciprocally rotatably driven by the first electric motor and coupled to the first wiper arm unit, the second speed reduction mechanism has a second output shaft reciprocally rotatably driven by the second electric motor and coupled to the second wiper arm unit, the first motor apparatus has: a first position sensor configured to detect a position of the first output shaft; and a first controller configured to generate a first position information signal of the first output shaft on the basis of the first position sensor and control a position of the first output shaft within a first control angle that is previously determined, the second motor apparatus has: a second position sensor configured to detect a position of the second output shaft; and a second controller configured to generate a second position information signal of the second output shaft on the basis of the second position sensor and control a position of the second output shaft within a second control angle smaller than the first control angle, the first controller and the second controller are electrically connected to each other, the first output shaft has a first stopper plate, the second output shaft has a second stopper plate, a width of the first stopper plate is smaller than a width of the second stopper plate, the first motor apparatus has a first stopper protrusion that is able to collide with the first stopper plate, the second motor apparatus has a second stopper protrusion that is able to collide with the second stopper plate, the first stopper protrusion and the first stopper plate prevent the first wiper arm unit from colliding with the first front pillar or the dash panel when the first output shaft is rotated beyond the first control angle, and the second stopper protrusion and the second stopper plate prevent the second wiper arm unit from colliding with the second front pillar or the dash panel when the second output shaft is rotated beyond the second control angle.

One of embodiments of the present invention is a wiper device configured to wipe a windshield of a vehicle and having two sets of wiper arm units and two sets of motor apparatuses, wherein the vehicle has a pair of first and second front pillars, and a dash panel coupled to the first and second front pillars, the windshield has a pair of side edge portions supported by the first and second front pillars, and a front edge portion supported by the dash panel, the wiper device has: a first wiper unit including a first wiper arm unit and a first motor apparatus and disposed at a first end portion of the dash panel; and a second wiper unit including a second wiper arm unit and a second motor apparatus and disposed at a second end portion of the dash panel, the first and second wiper units are disposed to face each other, the first motor apparatus has a first speed reduction mechanism and a first electric motor fixed to the first speed reduction mechanism, the second motor apparatus has a second speed reduction mechanism and a second electric motor fixed to the second speed reduction mechanism, the first speed reduction mechanism has a first output shaft reciprocally rotatably driven by the first electric motor and coupled to the first wiper arm unit of the first wiper unit, the second speed reduction mechanism has a second output shaft reciprocally rotatably driven by the second electric motor and coupled to the second wiper arm unit of the second wiper unit, the first motor apparatus has: a first position sensor configured to detect a position of the first output shaft; and a first controller configured to generate a first position information signal of the first output shaft on the basis of the first position sensor and control a position of the first output shaft within a first control angle that is previously determined, the second motor apparatus has: a second position sensor configured to detect a position of the second output shaft; and a second controller configured to generate a second position information signal of the second output shaft on the basis of the second position sensor and control a position of the second output shaft within a second control angle smaller than the first control angle, the first controller and the second controller are electrically connected to each other, the first wiper unit has a first stopper section, the second wiper unit has a second stopper section, a size of the first stopper section is smaller than a size of the second stopper section, the first otor apparatus has a first stopper protrusion that is able to collide with the first stopper section, the second motor apparatus has a second stopper protrusion that is able to collide with the second stopper section, the first stopper protrusion and the first stopper section prevent the first wiper arm unit from colliding with the first front pillar or the dash panel when the first output shaft is rotated beyond the first control angle, and the second stopper protrusion and the second stopper section prevent the second wiper arm unit from colliding with the second front pillar or the dash panel when the second output shaft is rotated beyond the second control angle.

In one of embodiments of the present invention, a shape of a housing of the first speed reduction mechanism is the same as a shape of a housing of the second speed reduction mechanism.

In one of embodiments of the present invention, the first stopper plate is disposed between a housing of the first speed reduction mechanism and the first wiper arm unit and fixed to the first output shaft, and the second stopper plate is disposed between a housing of the second speed reduction mechanism and the second wiper arm unit and fixed to the second output shaft.

In one of embodiments of the present invention, the first wiper arm unit of the first wiper unit and the second wiper arm unit of the second wiper unit operate between a first reversing position close to the dash panel and a second reversing position away from the dash panel to wipe the windshield, and the first wiper arm unit of the first wiper unit at the first reversing position is disposed between the second wiper arm unit of the second wiper unit at the first reversing position and the dash panel.

In one of embodiments of the present invention, the first motor apparatus is a brushless motor and the second motor apparatus is a brushless motor.

In one of embodiments of the present invention, the first controller generates the first position information signal at a time when the first stopper plate collides with the first stopper protrusion, and supplies the first position information signal to the second controller of the second motor apparatus, and the second controller rotates the second output shaft until the second stopper plate collides with the second stopper protrusion.

In one of embodiments of the present invention, the first controller generates the first position information signal at a time when the first stopper section collides with the first stopper protrusion, and supplies the first position information signal to the second controller, and the second controller rotates the second output shaft until the second stopper section collides with the second stopper protrusion.

In one of embodiments of the present invention, the second controller generates the second position information signal at a time when the second stopper plate collides with the second stopper protrusion, and supplies the second position information signal to the first controller, and the first controller rotates the first output shaft until the first stopper plate collides with the first stopper protrusion.

In one of embodiments of the present invention, the second controller generates the second position information signal at a time when the second stopper section collides with the second stopper protrusion, and supplies the second position information signal to the first controller, and the first controller rotates the first output shaft until the first stopper section collides with the first stopper protrusion.

In one of embodiments of the present invention, the second controller generates the second position information signal at a time when the second stopper plate collides with the second stopper protrusion, and supplies the second position information signal to the first controller, and the first controller reverses the first output shaft.

In one of embodiments of the present invention, the second controller generates the second position information signal at a time when the second stopper section collides with the second stopper protrusion, and supplies the second position information signal to the first controller, and the first controller reverses the first output shaft.

In one of embodiments of the present invention, the second controller generates the second position information signal at a time when the second stopper plate collides with the second stopper protrusion, and supplies the second position information signal to the first controller, and the first controller stops the first motor apparatus.

In one of embodiments of the present invention, the second controller generates the second position information signal at a time when the second stopper section collides with the second stopper protrusion, and supplies the second position information signal to the first controller, and the first controller stops the first motor apparatus.

Advantageous Effects of Invention

When the two sets of wiper units have different control angles for the wiper arm units, an operating range of the wiper arm unit of each of the wiper units can be appropriately restricted.

DESCRIPTION OF THE EMBODIMENTS

Hereinafter, an embodiment of the present invention will be described in detail with reference to the accompanying drawings.

Figure 1:
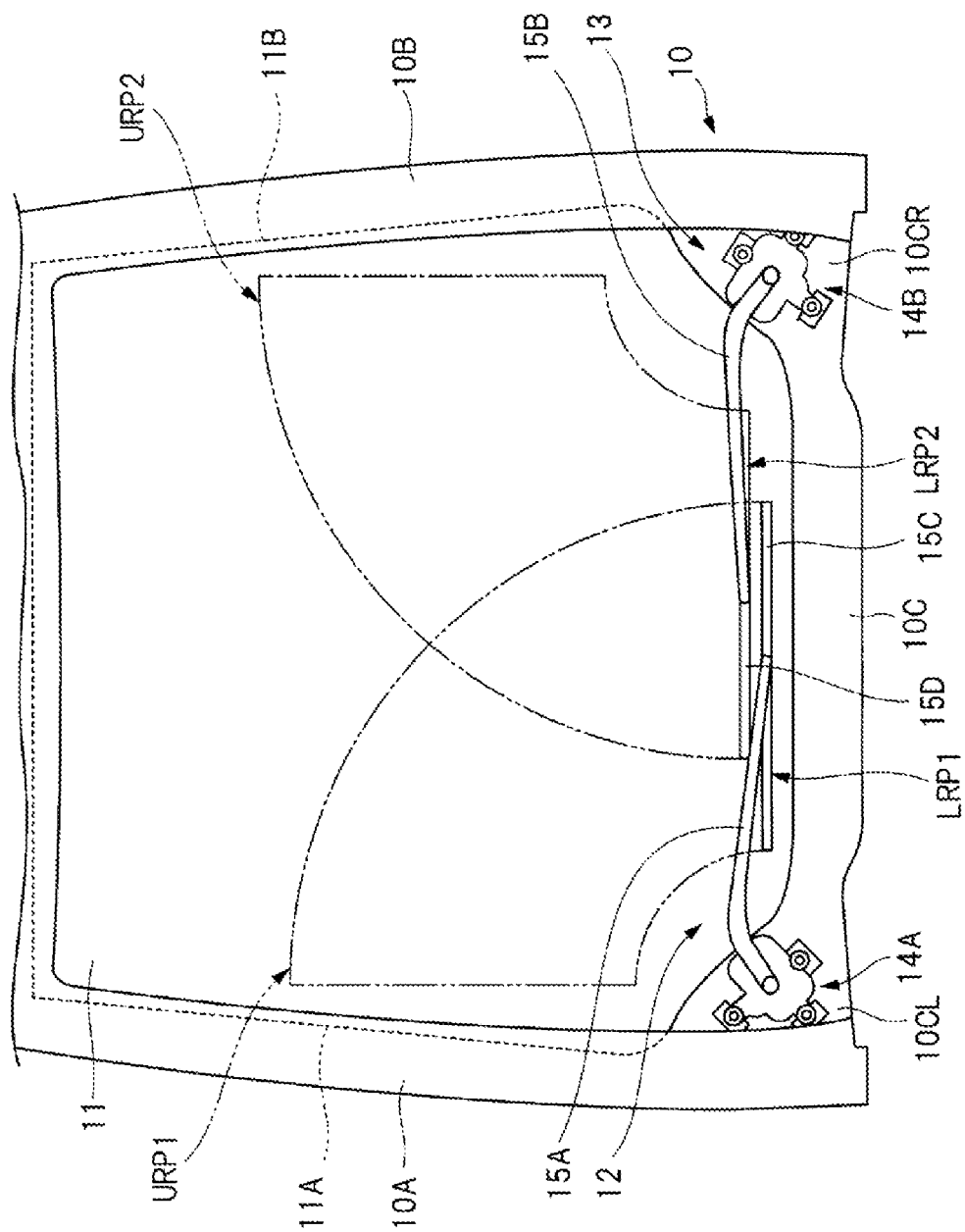
FIG. 1 is a plan view showing a state in which a wiper device of the present invention is mounted on a vehicle body.

As shown in FIG. 1, a windshield 11 is installed on a vehicle body 10 of an automobile as a vehicle. The vehicle body 10 includes front pillars 10A and 10B, and a dash panel 10C. A left end portion 10CL of the dash panel 10C is connected to the front pillar 10A and a right end portion 10CR is connected to the front pillar 10B. The left end portion 10CL and the right end portion 10CR are disposed at both ends of the dash panel 10C in a widthwise direction of the vehicle body 10.

The windshield 11 includes a left side edge portion 11A and a right side edge portion 11B, the left side edge portion 11A is supported by the front pillar 10A, and the right side edge portion 11B is supported by the front pillar 10B. Further, the windshield 11 includes a front edge portion 11C, and the front edge portion 11C is supported by the dash panel 10C.

A wiper unit 12 is disposed on the left end portion 10CL of the dash panel 10C and a wiper unit 13 is disposed on the right end portion 10CR of the dash panel 10C. The wiper unit 12 and the wiper unit 13 are two sets of wiper units that are disposed to face each other.

The wiper units 12 and 13 include motor apparatuses 14A and 14B and wiper arms 15A and 15B, respectively. Both of the motor apparatuses 14A and 14B of the wiper units 12 and 13 are attached to the dash panel 10C. Basic structures of the wiper units 12 and 13 are the same. The wiper arms 15A and 15B have wiper blade units 15C and 15D. The wiper blade units 15C and 15D have wiper blades (not shown). The wiper blade is integrally formed of a synthetic rubber, and the wiper blade wipes a surface of the windshield 11.

The wiper device of the embodiment is of a butterfly type. A butterfly type means that the wiper arm 15A and the wiper arm 15B are synchronized and operated in opposite orientations in the widthwise direction of the vehicle body 10. The butterfly type is also referred to as an opposite type or a facing wiping type.

Figure 2:
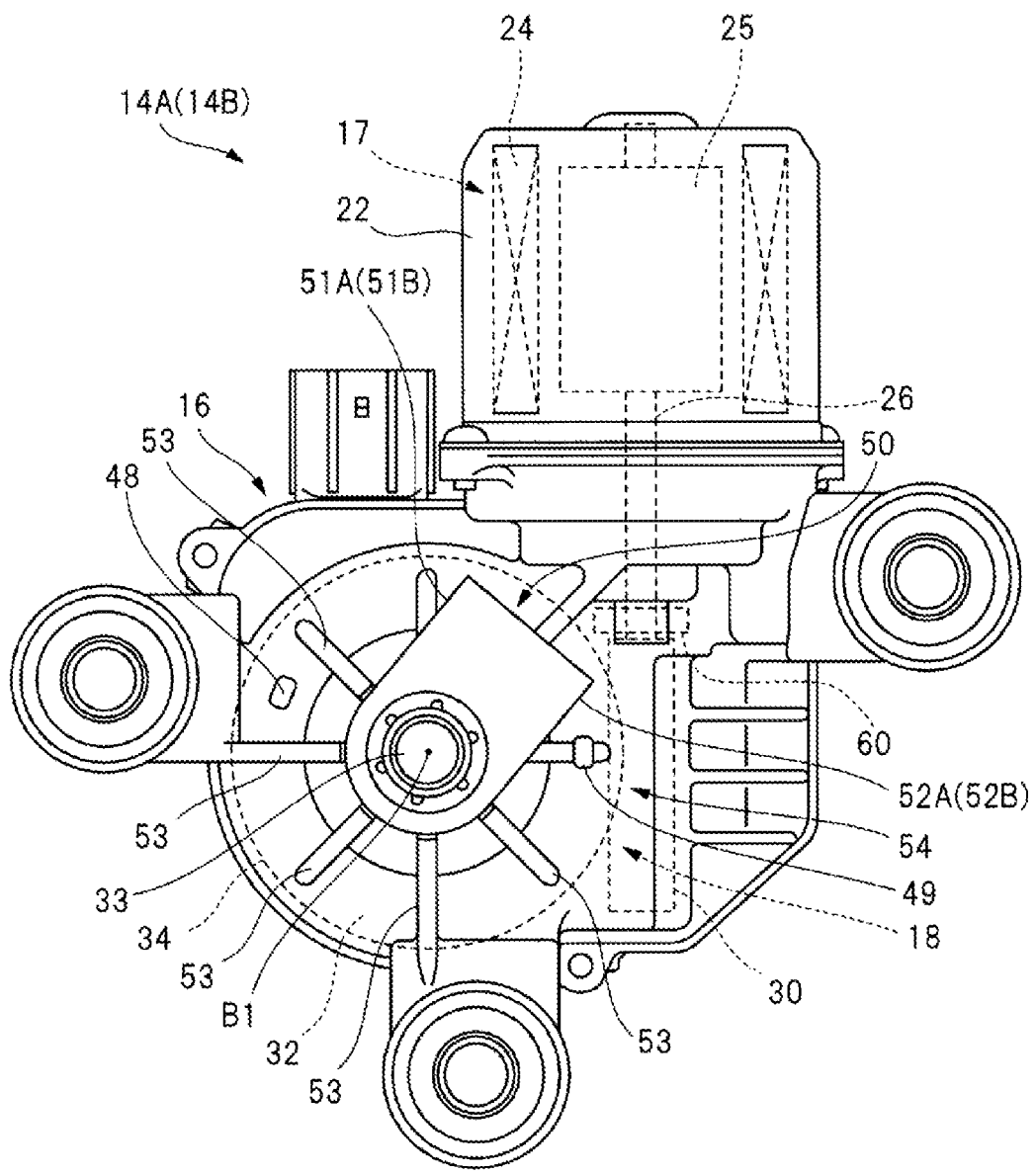
FIG. 2 is a plan view showing an embodiment of a motor apparatus in the wiper device of the present invention.

Embodiment 1 of the motor apparatus will be described with reference to FIGS. 2 to 4. As shown in FIG. 2, a motor apparatus 14 has a speed reduction mechanism 18, and a brushless motor 17 fixed to a housing 16 of the speed reduction mechanism 18.

The brushless motor 17 is a power source configured to drive the wiper arm 15A or the wiper arm 15B. The brushless motor 17 has a stator 24 fixed onto an inner wall of a motor cover 22, and a rotor 25 rotatably accommodated in the motor cover 22. The rotor 25 includes a rotary shaft 26 rotated integrally with the rotor 25. The rotary shaft 26 protrudes into the housing 16 of the speed reduction mechanism 18. The brushless motor 17 is an electric motor configured to receive electric power and rotate the rotary shaft 26. The rotary shaft 26 alternately repeats regular rotation and reverse rotation within a predetermined angular range. As shown in FIG. 2, a permanent magnet 60 is attached to the rotary shaft 26.

A worm wheel 32 is accommodated in the housing 16 of the speed reduction mechanism 18. The worm wheel 32 is fixed to an output shaft 33 and rotated integrally with the output shaft 33. A gear 34 is formed on an outer circumferential surface of the worm wheel 32, and the gear 34 is meshed with a worm 30. The worm 30 is coupled to the rotary shaft 26 of the brushless motor 17. Therefore, when the rotor 25 of the brushless motor 17 rotates and the rotary shaft 26 of the brushless motor 17 rotates with the rotor 25, the worm wheel 32 and the output shaft 33 are rotated. That is, the output shaft 33 is reciprocally rotatably driven by a rotating force of the brushless motor 17. As shown in FIG. 3, a permanent magnet 61 is attached to a center of the worm wheel 32, specifically, an end portion of the output shaft 33.

The housing 16 of the speed reduction mechanism 18 has a gear case 20 and a bottom cover 23. The output shaft 33 protrudes toward the outside of the gear case 20, and the wiper arm 15A or the wiper arm 15B is attached onto the output shaft 33. A support cylinder 20A is installed on the gear case 20, and the output shaft 33 is rotatably supported by the support cylinder 20A. Then, when the output shaft 33 rotates rightward, the wiper arms 15A and 15B are rotated rightward, and when the output shaft 33 rotates leftward, the wiper arms 15A and 15B are rotated leftward. As a result, the wiper arms 15A and 15B are swung. A plurality of ribs 53 configured to reinforce or support the support cylinder 20A are formed on the gear case 20.

A control board 19 is accommodated in the housing 16 of the speed reduction mechanism 18. A rotation sensor 36 and a position sensor 37 are installed on a control board 19. The rotation sensor 36 detects a rotation direction, a rotation speed and a rotational frequency of the rotary shaft 26 from variation in a magnetic field formed by the permanent magnet 60. The position sensor 37 detects rotation information of the output shaft 33, for example, a rotation position and outputs a signal from variation in a magnetic field or a magnetic force formed by the permanent magnet 61. Conventionally, a magneto-resistive effect device is used as the position sensor 37, and a Hall element is used as the rotation sensor 36.

The control board 19 has a controller 35 connected to the position sensor 37 and the rotation sensor 36. That is, the motor apparatuses 14A and 14B have the controllers 35, respectively, and can transmit and receive signals to/from each other between the controller 35 of the motor apparatus 14A and the controller 35 of the motor apparatus 14B. Transmission of a signal can be recognized as supply of a signal. Furthermore, the two controllers 35 control the brushless motors 17 and control swing movements of the wiper arms 15A and 15B, respectively.

The controller 35 stores programs, data and operational expressions that control the brushless motor 17. The controller 35 detects a rotation speed of the rotary shaft 26 of the brushless motor 17 on the basis of the signal provided from the rotation sensor 36, and detects a swing position of a wiper arm 15 on the basis of the signal provided from the position sensor 37. In addition, the controller 35 calculates a target rotation speed of the rotary shaft 26 and controls a rotation direction and a rotational frequency of the rotary shaft 26. Thus, an operating position of the wiper arm 15 is determined.

Figure 3:
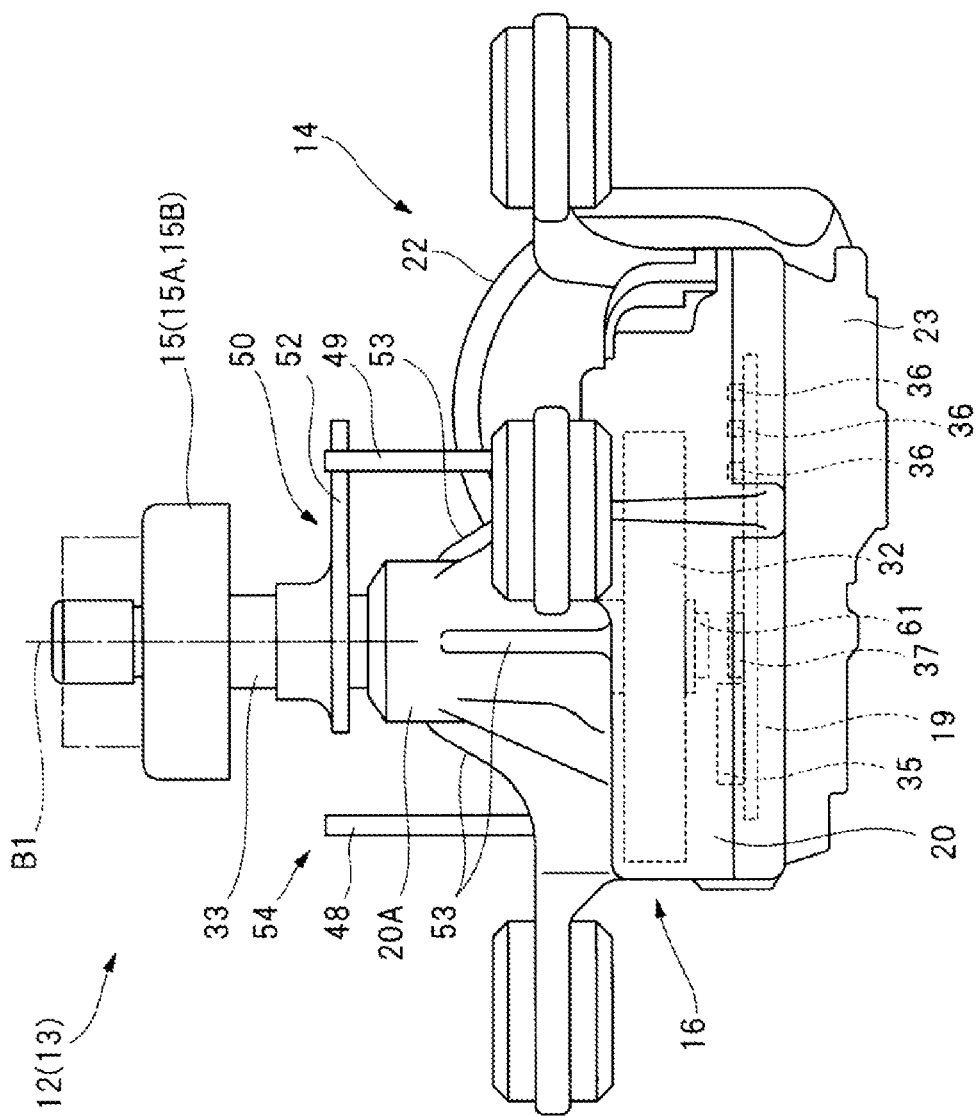
FIG. 3 is a side view of the motor apparatus shown in FIG. 2.

As shown in FIGS. 2 and 3, a plate 50 is fixed onto the output shaft 33. In addition, a pair of stopper protrusions 48 and 49 configured to restrict a movement position of the plate 50 are formed on the gear case 20. The plate 50 can collide with the stopper protrusions 48 and 49. The plate 50 and the stopper protrusions 48 and 49 prevent swing ranges of the wiper arms 15A and 15B from being excessively increased.

Next, an operation of the wiper unit 13 will be described. When a wiper switch (not shown) is turned ON, an ON signal is sent to the controller 35 and a rotation direction, a rotational frequency and a rotation speed of the rotor 25 of the brushless motor 17 are controlled. Rotation of the rotary shaft 26 of the rotor 25 is transmitted to the output shaft 33 via the worm 30 and the worm wheel 32 of the speed reduction mechanism 18. The output shaft 33 is reciprocally operated within a predetermined angular range, as a result, the wiper arms 15A and 15B are reciprocally operated within a predetermined angular range, and the wiper arms 15A and 15B are swung. Thus, a surface of the windshield 11 is wiped by the wiper blades.

The controller 35 detects a rotation direction, a rotation speed and a rotational frequency of the rotary shaft 26 from the rotation signal generated by the rotation sensor 36, and controls the brushless motor 17. In addition, the controller 35 indirectly detects operating positions of the wiper anus 15A and 15B using position signals generated by the position sensor 37, and controls a rotation angle and a rotation direction of the rotary shaft 26 on the basis of the detection result. Accordingly, operating angles of the wiper anus 15A and 15B and operating directions of the wiper arms 15A and 15B are controlled. A function of the wiper unit 12 is the same as that of the wiper unit 13.

When the wiper arm 15A and the wiper arm 15B are separated from lower reversing positions LRP1 and LRP2 that are home positions, first, the wiper arm 15B starts to move toward the front pillar 10B, and then, the wiper arm 15A starts to move toward the front pillar 10A. When the wiper arm 15A approaches the front pillar 10A, an operation of the wiper arm 15A is temporarily stopped. Then, the wiper arm 15A moves away from the front pillar 10A, and starts to move toward the dash panel 10C. When the wiper arm 15B approaches the front pillar 10B, an operation of the wiper arm 15B is temporarily stopped.

Then, the wiper arm 15B moves away from the front pillar 10B, and starts to move toward the dash panel 10C. When the wiper arm 15A moves away from the front pillar 10A and the wiper arm 15B moves away from the front pillar 10B, the wiper arm 15A is operated in advance and the wiper arm 15B moves behind the wiper arm 15A. The controllers 35 of the motor apparatuses 14A and 14B are electrically connected to each other, and the controllers 35 transmit or exchange position information of the wiper arm 15A and the wiper arm 15B, i.e., position information signals of the output shafts 33 of the motor apparatuses 14A and 14B. Thus, the wiper arm 15A and the wiper arm 15B are synchronously operated and move without coming into contact with each other.

The wiper arm 15A and the wiper arm 15B wipe matter on different wiping surfaces of the windshield 11 at different control angles and different operating speeds. For this reason, a control program stored in the controller 35 of the motor apparatus 14 of the wiper unit 12 is different from a control program stored in the controller 35 of the motor apparatus 14 of the wiper unit 13.

Figure 4:
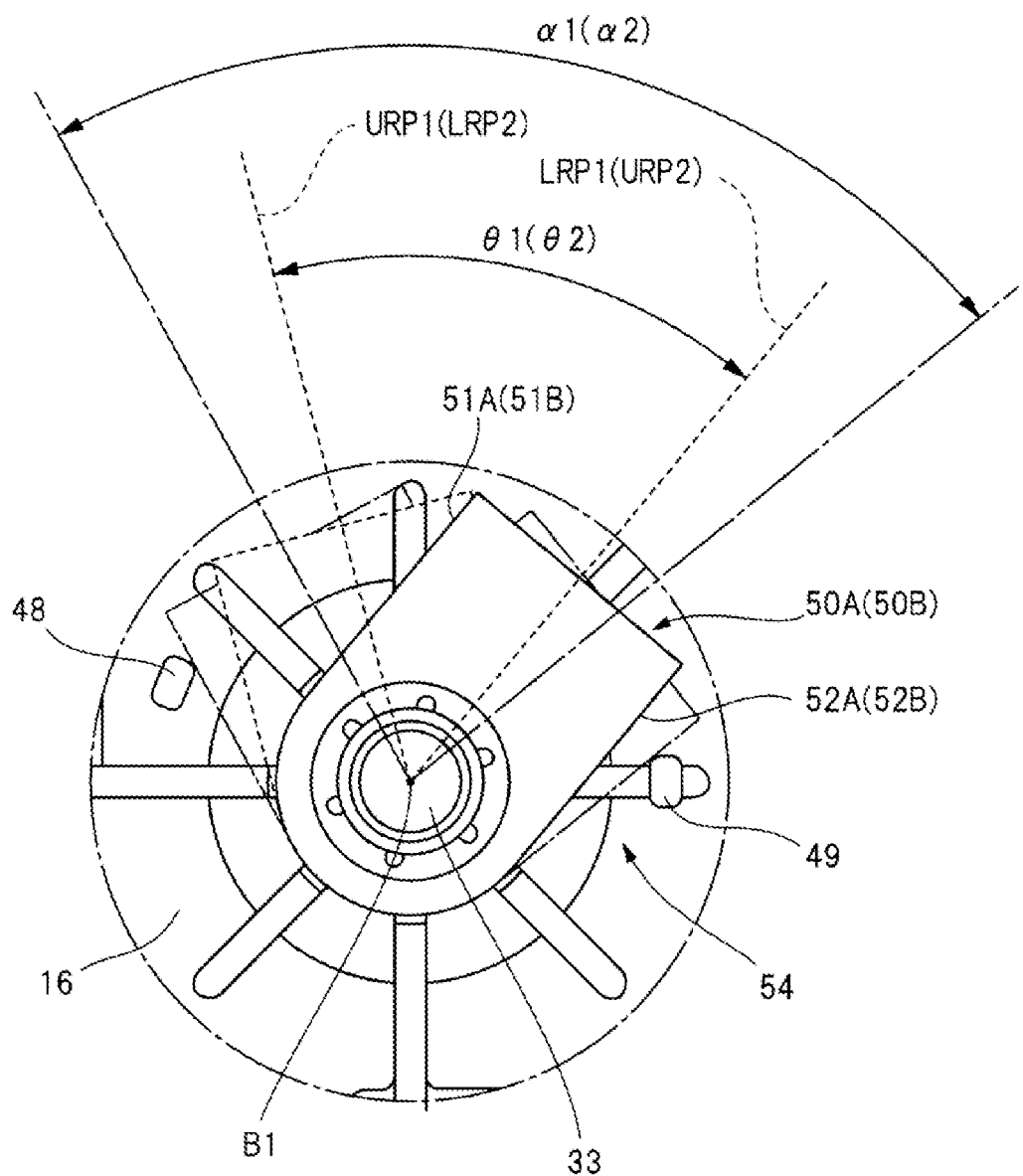
FIG. 4 is a partial plan view of the wiper device shown in FIGS. 2 and 3, showing a control angle and an operating angle of a wiper arm unit.

FIG. 4 shows operating angles of the wiper arms 15A and 15B. In FIG. 4, an operating position of the wiper arm 15A closest to the front pillar 10A is shown as an upper reversing position URP1, and an operating position of the wiper arm 15A closest to the front pillar 10A is shown as the lower reversing position LRP1. In addition, an operating position of the wiper arm 15B closest to the front pillar 10B is shown as an upper reversing position URP2, and an operating position of the wiper arm 15B closest to the front pillar 10B is shown as the lower reversing position LRP2. In FIG. 4, for the convenience of illustration, the upper reversing position URP1 and the lower reversing position LRP2 are shown as the same position, and the lower reversing position LRP1 and the upper reversing position URP2 are shown as the same position. A straight line showing the upper reversing position URP1 and a straight line showing the lower reversing position LRP2 pass through an axis B1. In addition, a straight line showing the lower reversing position LRP1 and a straight line showing the upper reversing position URP2 pass through the axis B1.

Thus, an angle formed by the upper reversing position URP1 and the lower reversing position LRP1 is a control angle θ1 of the wiper arm 15A. In addition, an angle fat lied by the upper reversing position URP2 and the lower reversing position LRP2 is a control angle θ2 of the wiper arm 15B.

In FIG. 4, while the control angle θ1 and the control angle θ2 are drawn in the same way, strictly speaking, the control angle θ2 of the wiper arm 15B is set to be smaller than the control angle θ1 of the wiper arm 15A. For example, the control angle θ1 of the wiper arm 15A is set to 91 degrees, and the control angle θ2 of the wiper arm 15B is set to 86 degrees. Further, in FIG. 4, for the convenience of illustration, the upper reversing position URP1 and the lower reversing position LRP2 are shown as the same position, and the lower reversing position LRP1 and the upper reversing position URP2 are shown as the same position. The control angle θ1 of the wiper arm 15A and the control angle θ2 of the wiper arm 15B are accomplished since the controller 35 controls a rotation angle and a rotation direction of the rotary shaft 26 of the brushless motor 17.

As shown in FIG. 1, the wiper arms 15A and 15B are operated between the lower reversing positions LRP1 and LRP2 close to the dash panel 10C and the upper reversing positions URP1 and URP2 separated from the dash panel 10C, respectively, to wipe the windshield 11. The wiper arm 15A at the lower reversing position LRP1 is disposed between the wiper arm 15B at the lower reversing position LRP2 and the dash panel 10C.

In the wiper device of the embodiment, the control angles θ1 and θ2 of the two wiper arms 15 are controlled by the controller 35. In addition, a maximum value of the operating ranges of the two wiper arms 15A and 15B is mechanically restricted by a stopper mechanism 54, i.e., the plate 50 and the stopper protrusions 48 and 49.

A structure of the stopper mechanism will be described with reference to FIG. 4. The stopper mechanism 54 restricts the amount of overrunning of the wiper arms 15A and 15B at previously determined positions when the output shaft 33 is operated with a large rotation angle due to certain causes, i.e., when the wiper arms 15A and 15B overrun beyond the control angles θ1 and θ2 set by the controlling of the controller 35. The stopper mechanism 54 is a mechanism configured to prevent the wiper blades of the wiper arms 15A and 15B from colliding with the front pillars 10A and 10B and the dash panel 10C of the vehicle body 10.

The stopper protrusions 48 and 49 are formed integrally with the gear case 20 and protrude from an outer surface of the gear case 20 in a rod shape in a direction along the axis B1. The stopper protrusion 48 and the stopper protrusion 49 are disposed at different positions about the axis B1 in the circumferential direction. The stopper protrusion 48 and the stopper protrusion 49 shown in FIG. 4 are disposed on the same circumference about the axis B1.

The plate 50A is fixed onto the output shaft 33 of the motor apparatus 14A, and the plate 50B is fixed onto the output shaft 33 of the motor apparatus 14B. The plates 50A and 50B are formed of metal, and the plates 50A and 50B are rotated integrally with the output shaft 33 and the wiper alms 15A and 15B. The plates 50A and 50B are disposed between the wiper arms 15A and 15B and the gear case 20, and the plates 50A and 50B protrude from the outer circumferential surface of the output shaft 33 in the radial direction.

The plate 50A has two edge portions 51A and 52A that are parallel to each other, and the plate 50B includes two edge portions 51B and 52B that are parallel to each other. A width of the plate 50A, i.e., a distance between the edge portion 51A and the edge portion 52A is smaller than a width of the plate 50B, i.e., a distance between the edge portion 51B and the edge portion 52B. A width of the plate 50A may be understood as a size of the plate 50A, and a width of the plate 50B may be understood as a size of the plate 50B.

Then, for example, when the plate 50A rotates with the wiper arm 15A, the wiper arm 15A can operate between a position at which the edge portion 51A of the plate 50 collides with the stopper protrusion 48 and a position at which the edge portion 52A of the plate 50 collides with the stopper protrusion 49. In addition, when the plate 50B rotates with the wiper arm 15B, the wiper arm 15B can operate between a position at which the edge portion 51B of the plate 50 collides with the stopper protrusion 48 and a position at which the edge portion 52B of the plate 50B collides with the stopper protrusion 49.

Maximum values α1 and α2 of operating angles of the wiper arms 15A and 15B in which the plates 50A and 50B collide with the stopper protrusion 48 and the stopper protrusion 49 are larger than the control angles θ1 and θ2 set by the control of the controller 35. For example, both of the maximum value α1 of the operating angle of the wiper arm 15A and the maximum value α2 of the operating angle of the wiper arm 15B may be set to 100 degrees.

For example, when the wiper arm 15A approaches the front pillar 10A, an edge portion 51 of the plate 50A approaches the stopper protrusion 48. When the wiper arm 15A moves away from the front pillar 10A, the edge portion 51 of the plate 50A moves away from the stopper protrusion 48, and an edge portion 52 of the plate 50A approaches the stopper protrusion 49. Thus, even when the wiper arm 15A approaches the front pillar 10A and the wiper arm 15A exceeds the upper reversing position URP1, before the wiper blade unit 15C comes in contact with the front pillar 10A, the edge portion 51 of the plate 50A collides with the stopper protrusion 48. Accordingly, a range in which the wiper arm 15A can operate is within a range determined by the stopper protrusion 48 and the stopper protrusion 49.

In this way, even when the wiper arm 15A operates beyond the upper reversing position URP1, the wiper blade unit 15C attached to the wiper arm 15A does not collide with the front pillar 10A. In addition, even when the wiper arm 15B operates beyond the upper reversing position URP2, the wiper blade unit 15D attached to the wiper arm 15B does not collide with the front pillar 10B.

As described above, the controllers 35 of the motor apparatuses 14A and 14B are electrically connected to each other, and the controllers 35 transmit or exchange position information of the wiper arm 15A and the wiper arm 15B to/with each other. Thus, the wiper arm 15A and the wiper arm 15B are synchronously operated. Then, due to certain causes, when the preceding wiper arm 15A passes over the lower reversing position LRP1 and the plate 50A of the motor apparatus 14A collides with the stopper protrusion 49, the controller 35 of the motor apparatus 14A generates position information, i.e., a position signal, of the output shaft 33 at that time, and supplies the position signal to the controller 35 of the motor apparatus 14B. Then, the controller 35 of the motor apparatus 14B intentionally moves the wiper arm 15B beyond the upper reversing position URP2. Then, the controller 35 rotates the output shaft 33 until the plate 50B of the motor apparatus 14B collides with the stopper protrusion 48.

Similarly, due to certain causes, when the preceding wiper arm 15B passes over the upper reversing position URP2 and the plate 50B of the motor apparatus 14B collides with the stopper protrusion 49, the controller 35 of the motor apparatus 14B generates position information, i.e., a position signal of the output shaft 33 at that time, and supplies the position signal to the controller 35 of the motor apparatus 14A. Then, the controller 35 of the motor apparatus 14A intentionally moves the wiper arm 15A beyond the upper reversing position URP1, and rotates the output shaft 33 until the plate 50A of the motor apparatus 14A collides with the stopper protrusion 48.

In addition, as described above, due to certain causes, when the preceding wiper arm 15B passes over the upper reversing position URP2 and the plate 50B of the motor apparatus 14B collides with the stopper protrusion 49, the controller 35 of the motor apparatus 14B generates position information, i.e., a position signal of the output shaft 33 at that time, and supplies the position signal to the controller 35 of the motor apparatus 14A. Then, the controller 35 of the motor apparatus 14A intentionally reverses the wiper arm 15A from a position at which the signal transmitted from the controller 35 of the motor apparatus 14B is received. Then, the wiper arm 15B is inverted to follow the inverted wiper arm 15A, and control of wiping the predetermined wiping range is performed such that the wiper arms do not interfere with each other.

Similarly, due to certain causes, when the preceding wiper arm 15A passes over the lower reversing position LRP1 and the plate 50A of the motor apparatus 14A collides with the stopper protrusion 49, the controller 35 of the motor apparatus 14A generates position information, i.e., a position signal of the output shaft 33 at that time, and supplies the position signal to the controller 35 of the motor apparatus 14B. Then, the controller 35 of the motor apparatus 14B intentionally reverses the wiper arm 15B from a position at which the signal transmitted from the controller 35 of the motor apparatus 14A is received. Then, the wiper arm 15B is inverted to follow the inverted wiper arm 15A, and control of wiping the predetermined wiping range is performed such that the wiper arms do not interfere with each other.

Further, as described above, due to certain causes, when the preceding wiper arm 15B passes over the upper reversing position URP2 and the plate 50B of the motor apparatus 14B collides with the stopper protrusion 49, the wiper arm 15B is intentionally stopped at this position. Then, the controller 35 of the motor apparatus 14B generates position information, i.e., a position signal of the output shaft 33 at that time, and supplies the position signal to the controller 35 of the motor apparatus 14A. Then, the controller 35 of the motor apparatus 14A performs control of intentionally stopping the wiper arm 15A at a position at which a signal transmitted from the controller 35 of the motor apparatus 14B is received. After that, after any motor apparatus receives a conventional position signal, the motor apparatuses 14A and 14B can also be controlled such that the wiper arms 15A and 15B do not interfere with each other.

Similarly, due to certain causes, when the preceding wiper arm 15A passes over the lower reversing position LRP1 and the plate 50A of the motor apparatus 14A collides with the stopper protrusion 49, the wiper arm 15A is intentionally stopped at this position. Then, the controller 35 of the motor apparatus 14A generates position information, i.e., a position signal of the output shaft 33 at that time, and supplies the position signal to the controller 35 of the motor apparatus 14B. Then, the controller 35 of the motor apparatus 14B performs control of intentionally stopping the wiper arm 15B at a position at which a signal transmitted from the controller 35 of the motor apparatus 14A is received. After that, after any motor apparatus receives a conventional position signal, the motor apparatuses 14A and 14B can also be controlled such that the wiper arms 15A and 15B do not interfere with each other.

Further, in the wiper unit 12 and the wiper unit 13, when the maximum values $\alpha 1$ and $\alpha 2$ of the operating angles of the wiper arms 15A and 15B are equal to 100 degrees, a shape and a structure of the housing 16 including positions and sizes of the stopper protrusion 48 and the stopper protrusion 49 and a shape and structure of the other parts are the same as each other. Meanwhile, the control angle $\theta 1$ set by the controller 35 of the wiper unit 12 is different from the control angle $\theta 2$ set by the controller 35 of the wiper unit 13. Accordingly, control programs of the controllers 35 are different. However, parts of the wiper unit 12 and the wiper unit 13 are the same parts except for the control programs of the controllers 35.

Further, the plates 50A and 50B may have tips curved downward and may be formed in an L shape. In this case, the stopper protrusion 48 and the stopper protrusion 49 are formed in plate shapes, and the curved tip end portions collide with a plate-shaped stopper protrusion.

Describing the meaning of matters described in the embodiment, the wiper unit 12 is a first wiper unit, the wiper unit 13 is a second wiper unit, the control angle $\theta 1$ is a first control angle, and the control angle $\theta 2$ is a second control angle. The speed reduction mechanism 18 is constituted by a first speed reduction mechanism and a second speed reduction mechanism, the front pillar 10A is a first front pillar, and the front pillar 10B is a second front pillar. The wiper arm 15A and the wiper blade unit 15C constitute a first wiper arm unit, and the wiper arm 15B and the wiper blade unit 15D constitute a second wiper arm unit. The left side edge portion 11A and the right side edge portion 11B are a pair of side edge portions. The motor apparatus 14A is a first motor apparatus, the motor apparatus 14B is a second motor apparatus, and the brushless motor 17 is constituted by a first electric motor and a second electric motor.

The left end portion 10CL is a first end portion and the right end portion 10CR is a second end portion. The output shaft 33 is constituted by a first output shaft and a second output shaft. The position sensor 37 is constituted by a first position sensor and a second position sensor. The controller 35 is constituted by a first controller and a second controller. The plate 50 installed in the motor apparatus 14A is constituted by a first stopper plate and a first stopper section, and the plate 50 installed in the motor apparatus 14B is constituted by a second stopper plate and a second stopper section. The stopper protrusions 48 and 49 formed on the motor apparatus 14A constitute a first stopper protrusion, and the stopper protrusions 48 and 49 formed on the motor apparatus 14B constitute a second stopper protrusion. A position information signal of the output shaft 33 of the motor apparatus 14A is a first position information signal. A position information signal of the output shaft 33 of the motor apparatus 14B is a second position information signal. The lower reversing positions LRP1 and LRP2 constitute a first reversing position, and the upper reversing positions URP1 and URP2 constitute a second reversing position.

INDUSTRIAL APPLICABILITY

The present invention is installed on a vehicle such as an automobile and can be used as a wiper device configured to wipe a windshield of the vehicle.

What is claimed is:

1. A wiper device, which is a butterfly type wiper device and is configured to wipe a windshield of a vehicle and having two sets of wiper arm units and two sets of motor apparatuses,
wherein the vehicle has a pair of first and second front pillars, and a dash panel coupled to the first and second front pillars,
the windshield has a pair of side edge portions supported by the first and second front pillars and a front edge portion supported by the dash panel,
the wiper device comprises:
a first wiper unit including a first wiper arm unit and a first motor apparatus and disposed at a first end portion of the dash panel; and
a second wiper unit including a second wiper arm unit and a second motor apparatus and disposed at a second end portion of the dash panel,
the first and second wiper units are disposed to face each other,
the first motor apparatus has a first speed reduction mechanism and a first electric motor fixed to the first speed reduction mechanism,
the second motor apparatus has a second speed reduction mechanism and a second electric motor fixed to the second speed reduction mechanism,
the first speed reduction mechanism has a first output shaft reciprocally rotatably driven by the first electric motor and coupled to the first wiper arm unit of the first wiper unit,
the second speed reduction mechanism has a second output shaft reciprocally rotatably driven by the second electric motor and coupled to the second wiper arm unit of the second wiper unit, the first motor apparatus comprises:
a first position sensor configured to detect a position of the first output shaft of the first speed reduction mechanism; and
a first controller configured to generate a first position information signal of the first output shaft on basis of the first position sensor and control a position of the first output shaft within a first control angle that is previously determined,
the second motor apparatus has:
a second position sensor configured to detect a position of the second output shaft of the second speed reduction mechanism; and
a second controller configured to generate a second position information signal of the second output shaft on basis of the second position sensor and control a position of the second output shaft within a second control angle that is smaller than the first control angle,
the first controller and the second controller are electrically connected to each other,
the first controller supplies the first position information signal to the second controller,
the second controller supplies the second position information signal to the first controller,
the first output shaft has a first stopper plate,
the second output shaft has a second stopper plate,
a width of the first stopper plate is smaller than a width of the second stopper plate,
the first speed reduction mechanism has a first stopper protrusion that is able to collide with the first stopper plate,
the second speed reduction mechanism has a second stopper protrusion that is able to collide with the second stopper plate,
the first stopper protrusion and the first stopper plate prevent the first wiper arm unit from colliding with the first front pillar or the dash panel when the first output shaft is rotated beyond the first control angle, and
the second stopper protrusion and the second stopper plate prevent the second wiper arm unit from colliding with the second front pillar or the dash panel when the second output shaft is rotated beyond the second control angle.

2. The wiper device according to claim 1, wherein a shape of a housing of the first speed reduction mechanism is the same as a shape of a housing of the second speed reduction mechanism.

3. The wiper device according to claim 1, wherein the first stopper plate is disposed between a housing of the first speed reduction mechanism and the first wiper arm unit and fixed to the first output shaft, and
the second stopper plate is disposed between a housing of the second speed reduction mechanism and the second wiper arm unit and fixed to the second output shaft.

4. The wiper device according to claim 1, wherein the first wiper arm unit of the first wiper unit and the second wiper arm unit of the second wiper unit operate between a first reversing position close to the dash panel and a second reversing position away from the dash panel to wipe the windshield, and
the first wiper arm unit of the first wiper unit at the first reversing position is disposed between the second wiper arm unit of the second wiper unit at the first reversing position and the dash panel.

5. The wiper device according to claim 1, wherein the first motor apparatus is a brushless motor and the second motor apparatus is a brushless motor.

6. The wiper device according to claim 1, wherein, the first controller generates the first position information signal at a time when the first stopper plate collides with the first stopper protrusion, and supplies the first position information signal to the second controller of the second motor apparatus, and the second controller rotates the second output shaft until the second stopper plate collides with the second stopper protrusion.

7. The wiper device according to claim 1, wherein, the second controller generates the second position information signal at a time when the second stopper plate collides with the second stopper protrusion, and supplies the second position information signal to the first controller, and the first controller rotates the first output shaft until the first stopper plate collides with the first stopper protrusion.

8. The wiper device according to claim 1, wherein, the second controller generates the second position information signal at a time when the second stopper plate collides with the second stopper protrusion, and supplies the second position information signal to the first controller, and the first controller reverses the first output shaft.

9. The wiper device according to claim 1, wherein, the second controller generates the second position information signal at a time when the second stopper plate collides with the second stopper protrusion, and supplies the second position information signal to the first controller, and the first controller stops the first motor apparatus.

* * * * *